United States Patent
Marupaduga et al.

(10) Patent No.: US 9,706,555 B1
(45) Date of Patent: Jul. 11, 2017

(54) OPTIMIZING WIRELESS NETWORK CAPACITY BASED ON RHO VALUE

(71) Applicant: Sprint Spectrum L.P., Overland Park, KS (US)

(72) Inventors: Sreekar Marupaduga, Overland Park, KS (US); John W. Prock, Raymore, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 55 days.

(21) Appl. No.: 14/789,163

(22) Filed: Jul. 1, 2015

(51) Int. Cl.
*H04W 72/04* (2009.01)
*H04W 24/02* (2009.01)
*H04W 48/06* (2009.01)
*H04W 88/08* (2009.01)
*H04W 88/02* (2009.01)

(52) U.S. Cl.
CPC ....... *H04W 72/0486* (2013.01); *H04W 24/02* (2013.01); *H04W 48/06* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 5,530,917 A * | 6/1996 | Andersson | ............ | H04W 28/08 455/436 |
| 6,421,335 B1 * | 7/2002 | Kilkki | ............ | H04B 7/264 370/328 |
| 6,529,520 B1 * | 3/2003 | Lee | ............ | H04L 12/5602 370/442 |
| 6,920,107 B1 * | 7/2005 | Qureshi | ............ | H04L 47/10 370/230 |
| 6,944,463 B2 * | 9/2005 | Gunreben | ............ | H04W 16/06 455/424 |
| 7,072,663 B2 * | 7/2006 | Ramos | ............ | H04W 16/14 455/436 |
| 7,660,649 B1 * | 2/2010 | Hope | ............ | G06Q 10/04 700/28 |
| 7,751,839 B2 * | 7/2010 | Bowers | ............ | H04W 36/26 455/450 |
| 7,817,609 B2 * | 10/2010 | Law | ............ | H04W 74/002 370/338 |
| 7,836,181 B2 * | 11/2010 | Bejerano | ............ | H04W 48/20 709/226 |

(Continued)

Primary Examiner — Gregory Sefcheck

(57) ABSTRACT

During the operation of a radio access network (RAN), the RAN will determine a measure of capacity of a frequency channel based on a modulation quality (Rho) of the frequency channel and will intelligently manage use of the frequency channel based on the determined Rho. Through this process, the RAN may thereby attempt to serve each WCD with an appropriate level of service by reducing a maximum load level for the frequency channel. In response to a WCD attempting to register on a frequency channel, the RAN may determine if registering the WCD would cause a current load level to exceed the maximum load level of the frequency channel. If registering would cause a current load level of the frequency channel to exceed the maximum load level, the RAN may cause the WCD to register on a different frequency channel. If not, the RAN may allow the registration.

17 Claims, 5 Drawing Sheets

(56) References Cited

U.S. PATENT DOCUMENTS

| | | | | |
|---|---|---|---|---|
| 7,920,991 | B2* | 4/2011 | Kodialam | H04L 41/145 |
| | | | | 370/329 |
| 8,169,993 | B2* | 5/2012 | Huang | H04B 17/309 |
| | | | | 370/343 |
| 8,270,975 | B2* | 9/2012 | Kim | H04W 36/22 |
| | | | | 455/436 |
| 8,422,506 | B2* | 4/2013 | Wang | H04L 47/125 |
| | | | | 370/216 |
| 8,594,672 | B2* | 11/2013 | Agrawal | H04W 36/0083 |
| | | | | 370/331 |
| 8,671,409 | B2* | 3/2014 | Spata | G06F 9/5072 |
| | | | | 718/102 |
| 8,711,812 | B2* | 4/2014 | Quan | H04L 5/003 |
| | | | | 370/230 |
| 8,886,209 | B2* | 11/2014 | Shaw | H04W 36/22 |
| | | | | 370/331 |
| 8,938,249 | B2* | 1/2015 | Franceschini | H04W 16/06 |
| | | | | 455/453 |
| 9,066,278 | B2* | 6/2015 | Kwan | H04L 47/823 |
| 9,179,363 | B2* | 11/2015 | Siomina | H04W 28/0236 |
| 9,210,009 | B2* | 12/2015 | Pashay-Kojouri | H03F 3/193 |
| 9,301,301 | B2* | 3/2016 | Aumann | |
| 9,350,405 | B2* | 5/2016 | Zhu | H04B 1/0458 |
| 9,363,814 | B2* | 6/2016 | Borst | H04L 65/4084 |
| 9,432,228 | B2* | 8/2016 | Pashay-Kojouri | H03F 3/193 |
| 2015/0223251 | A1* | 8/2015 | Geijer Lundin | H04W 72/1252 |
| | | | | 370/329 |
| 2016/0050587 | A1* | 2/2016 | Lam | H04W 28/08 |
| | | | | 370/235 |

\* cited by examiner

OPTIMIZING WIRELESS NETWORK CAPACITY BASED ON RHO VALUE

BACKGROUND

Unless otherwise indicated herein, the description provided in this section is not itself prior art to the claims and is not admitted to be prior art by inclusion in this section.

To provide cellular wireless communication service, a wireless service provider typically operates a radio access network (RAN) that includes at least one base station (BS) that radiates to define wireless coverage areas, such as cells and cell sectors, in which wireless communication devices (WCDs), such as cell phones, tablet computers, tracking devices, embedded wireless modules, and other wirelessly-equipped communication devices, can operate. In turn, each BS may be coupled with network infrastructure that provides connectivity with one or more transport networks, such as the public switched telephone network (PSTN) and/or the Internet for instance. With this arrangement, a WCD within coverage of the RAN may engage in air interface communication with a BS and may thereby communicate via the BS with various remote network entities or with other WCDs served by the BS.

In general, a RAN may operate in accordance with a particular air interface protocol or "radio access technology," that includes a downlink (also known as a forward link) and an uplink (also known as a reverse link). The downlink is the communication from the BS to the WCD and the uplink is the communication from the WCD to the BS. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carriers in particular frequency bands (such as 698-960 MHz, 1610-2025 MHz, etc.), with each carrier defining one or more frequency channels for carrying information between the BS and WCDs. By way of example, each carrier may define a downlink frequency channel and a separate uplink frequency channel, each spanning a particular bandwidth in the frequency spectrum. Or each carrier may define a single frequency channel that is divided over time into downlink and uplink segments.

In addition, each coverage area may define various logical channels for carrying certain types of information, data, or signaling between the BS and WCDs, with the channels being defined in various ways, such as through frequency division multiplexing, time division multiplexing, and/or code division multiplexing, for instance. By way of example, each coverage area may define a pilot channel or reference channel for carrying a pilot signal or reference signal that WCDs may detect as an indication of coverage and may measure to evaluate coverage strength. Further, each coverage area may define one or more downlink control channels or other resources on which the BS may transmit control messages or other information to WCDs, and one or more uplink control channels or other resources on which WCDs may transmit control messages to the BS. Further, each coverage area may define one or more traffic channels or other resources for carrying bearer data (e.g., application layer traffic), such as voice communication, video communication, web communication, gaming communication, Session Initiation Protocol (SIP) signaling, and other data between the BS and WCDs.

When a WCD first powers on or enters into a BS's coverage area, the WCD may register with the RAN in that coverage area by transmitting a registration request, such as an attach request, to the BS serving that coverage area. In response to the BS receiving the registration request, the BS or associated network infrastructure may authenticate and authorize the WCD for service and may reserve network resources for use to serve the WCD. For instance, the registration request may lead to setup in the network of one or more logical bearers, data-link-layer connections, or the like, as well as assignment to the WCD of a radio-link-layer connection defining a downlink and uplink over the air between the WCD and the BS.

Once the WCD is registered with the BS, the WCD may then operate in either a connected mode or an idle mode. In the connected mode, the WCD may engage in communication of bearer data, such as by transmitting bearer data on uplink traffic channels to the BS and receiving bearer data on downlink traffic channels from the BS. And in the idle mode, the WCD may monitor a downlink control channel for an indication from the RAN that the WCD should begin a communication session.

Overview

In practice, a BS may communicate with at least one WCD over at least one frequency channel of both a downlink and an uplink. As noted above, the RAN sends data to the WCD over the downlink, and WCD sends data to the RAN over the uplink. Both the downlink and the uplink have a respective frequency channel over which WCD and the RAN can communicate. Further, as noted above, the downlink and the uplink may operate on a shared frequency channel, and in other instances, the downlink and the uplink may operate on different respective frequency channels.

During a communication session, a filter in the RAN may filter signals sent over the downlink and/or received over the uplink. The filter in the RAN may be configured as a band-pass filter, which is a filter that passes frequencies within a particular pass band of the filter and blocks frequencies outside the pass band of the filter. When the filter passes signals, it may also cause some time delay, such as group delay, in the signals. The amount of the group delay may vary as a function of frequency. For example, near the edges of the filter's pass band, the group delay may be higher than near the center of the filter's pass band.

In practice, the pass band of such a filter may encompass one or more frequency channels on which the BS is configured to communicate with WCDs. Each such frequency channel may thus exist at a particular place within the filter's pass band and may have associated group delay based on its location in the pass band, such as higher group delay if near the edge of the pass band or lower group delay if near the center of the filter's pass band. Furthermore, because a frequency channel itself defines a range of frequency, the frequency channel may also have a variation in group delay across its bandwidth, as some portions of its frequency may be closer than other portions of its frequency to an edge of the filter's pass band.

This group delay variation (GDV) of a frequency channel may give rise to distortions in signals transmitted on the frequency channel. Further, these distortions may manifest as modulation errors in the transmitted signals, which a receiving WCD or BS may perceive as reduced signal-to-noise ratio. As a result, the GDV-caused modulation errors may effectively reduce the capacity of the frequency channel. In particular, the apparent noise resulting from higher GDV of a frequency channel may prevent the RAN from efficiently or effectively serving as many WCDs at a time on the frequency channel, and vice versa.

In accordance with the present disclosure, a RAN will determine a measure of capacity of a frequency channel based on modulation quality of the frequency channel and will then intelligently manage use of the frequency channel based on the determined modulation quality. Through this process, the RAN may thereby help to ensure that each served WCD receives an appropriate level of service.

In practice, for instance, the RAN may determine a representation of a modulation quality respectively for each of one or more frequency channels on which a BS is configured to operate. In particular, the RAN may determine as the representation of modulation quality a value referred to as Rho. In general, Rho can range from 0 to 1, where a Rho value of 1 indicates perfect modulation and a value of 0 indicates completely imperfect modulation. Perfect modulation means that all of the power of a received signal is correlated with a hypothetical power of an ideally modulated signal. Whereas completely imperfect modulation means that none of the power of a received signal is correlated with the hypothetical power of the ideally modulated signal. In practice, a completely imperfectly modulated signal would appear as noise to a receiver.

The value of Rho that the RAN determines for a frequency channel may be based, at least in part, on the GDV of the frequency channel based on where the frequency channel sits within the pass band of a filter in the RAN, since, as noted above, the GDV of a frequency channel tends to introduce modulation errors. Further, other parameters of the frequency channel, such as radio conditions and other transceiver equipment may also introduce modulation errors, resulting in further reduction in its value of Rho.

Based on the value of Rho that the RAN determines for a given frequency channel, the RAN may then establish a maximum load level (i.e., a load level limit) to apply for the frequency channel, as a limit on the number of WCDs the RAN will allow to be served on the frequency channel and/or as a limit on the throughput that the RAN will provide for data transmission on the frequency channel. In practice, for instance, the RAN may default to having a maximum load level for a given frequency channel equal to the theoretical maximum load level for the given frequency channel, or some other predetermined maximum load level. The maximum load level established by the RAN may be less than the default maximum load level of the frequency channel. Because the maximum load level that the RAN determines may be less than the default maximum load level of the frequency channel, the RAN may effectively reduce the maximum load level of the frequency channel compared to the theoretical maximum load level.

In practice, for instance, the RAN may store or otherwise have access to a lookup table that correlates various values of Rho to maximum load levels, and the RAN may refer to that lookup table to determine a maximum load level for a frequency channel based on the value of Rho that the RAN determined for the frequency channel.

In one implementation, where a frequency channel's value of Rho is based primarily on where the frequency channel falls within a filter's pass band, a representative value of Rho for the frequency channel may be predetermined. For instance, upon installation of the filter in the RAN, the RAN may be provisioned by engineering input or the like with data that specifies the value of Rho for each frequency channel that falls within the filter's pass band. In particular, such data could be calculated in advance based on the GDV of the frequency channel with respect to the filter's pass band. Further, the RAN could likewise be provisioned with the lookup table noted above, correlating each frequency channel with a maximum load level, which could be established based on the frequency channel's determined value of Rho or other such measure of modulation quality of the frequency channel.

In another implementation, the RAN may evaluate received signal quality on a frequency channel and determine a value of Rho based on the received signal quality, which could account for factors beyond GDV, such as radio multipath and the like. In turn, the RAN may then refer to a lookup table or apply other logic to correlate the determined value of Rho with a maximum load level to apply for the frequency channel.

As noted above, the maximum load level that the RAN determines for a frequency channel could define a maximum number of WCDs that the RAN would serve at a given time on the frequency channel and/or a maximum throughput that the RAN would allow on the frequency channel. If the frequency channel has a low value of Rho, then the RAN may apply a lower maximum load level so as to serve fewer WCDs at a time on the frequency channel and/or to provide lower throughput to the WCDs served on the frequency channel. Whereas, if the frequency channel has a high value of Rho, then the RAN may apply a higher maximum load level so as to serve a greater number of WCDs at a time on the frequency channel and/or to provide higher throughput to the WCDs served on the frequency channel.

With this process, when a WCD attempts to register with the RAN, the RAN may determine if allowing the WCD to register (and thus to be served) on the frequency channel would cause the maximum load level of the frequency channel to be exceeded. If so, then the RAN may prevent the WCD from registering (and thus being served) on the frequency channel, possibly instead directing or otherwise causing the WCD to be served on a different frequency channel or perhaps an altogether different coverage area of the RAN. Whereas, if not, then the RAN may allow the WCD to register (and thus be served) on the frequency channel. Further, based on the determined maximum load level of the frequency channel, the RAN may limit throughput of communications to and from one or more WCDs served on the frequency channel.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Figure 1:
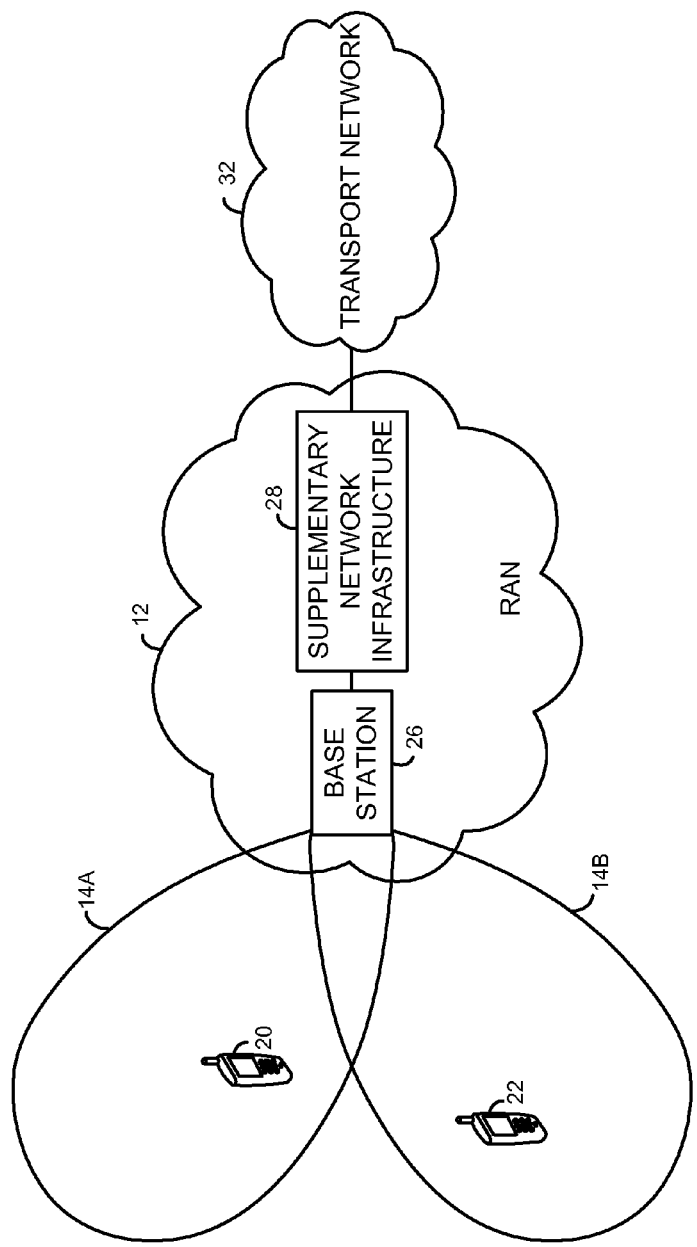
FIG. 1 is a simplified block diagram of a communication network.

Referring to the drawings, FIG. 1 is a simplified block diagram of a communication network in which at least one embodiment of the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor executing program instructions stored in memory or another such non-transitory machine-readable medium may carry out various functions.

As shown in FIG. 1, an exemplary network includes at its core a RAN 12 including a BS 26 and supplementary network infrastructure 28 that provides connectivity with a transport network 32 such as the PSTN and/or the Internet. RAN 12 may operate according to various wireless protocols, including but not limited to those mentioned above for instance.

In a representative system, the BS includes one or more antennas or antenna arrangements that radiate to define one or more wireless coverage areas, such as cells or cell sectors, in which WCDs can communicate with the BS. The wireless coverage area(s) may include a plurality of wireless coverage areas, including representative wireless coverage areas 14A and 14B. Shown operating in the coverage areas, by way of example, are WCDs 20 and 22, which communicate over the air with the RAN 12. Each of WCDs 20 and 22 is shown in communication with the BS 26 by way of a different wireless coverage area of the RAN 12. As shown in FIG. 1, WCD 20 is in communication with the BS 26 by way of wireless coverage area 14A and WCD 22 is in communication with the BS 26 by way of wireless coverage area 14B.

As noted above, each wireless coverage area may serve a region in which the BS may communicate with WCDs, and within each wireless coverage area the BS may transmit on a plurality of frequency channels. As shown in the figure, there may be an overlap region of wireless coverage areas where a WCD may be able to communicate with two wireless coverage areas simultaneously or with either coverage area. While in such an overlap region, the RAN may determine with which wireless coverage area to communicate with the WCD. For instance, the RAN may determine a movement of a WCD and assign the WCD to a wireless coverage area based on the determined movement of the WCD in order to keep the WCD within a coverage area as it moves. Further, as noted above, the BS may be configured to operate on one or more frequency channels in each coverage area. Thus, when a WCD is within a particular coverage area, it may be possible for the BS to serve the WCD on one or more such frequency channels.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network, or merely provides connectivity between WCDs. And at a more complex level, the RAN may comprise the BS and assorted supplementary network infrastructure as shown.

The supplementary network infrastructure 28 may be connected with, and control, one or more BSs and may manage various aspects of air-interface operation, such as handoffs between BSs or the like. As such, the supplementary network infrastructure may include a network controller such as a base station controller, a mobile switching center, a mobility management entity, or the like. Further, the supplementary network infrastructure 28 may include a switch/gateway that provides connectivity with one or more transport networks such as transport network 32.

Figure 2:
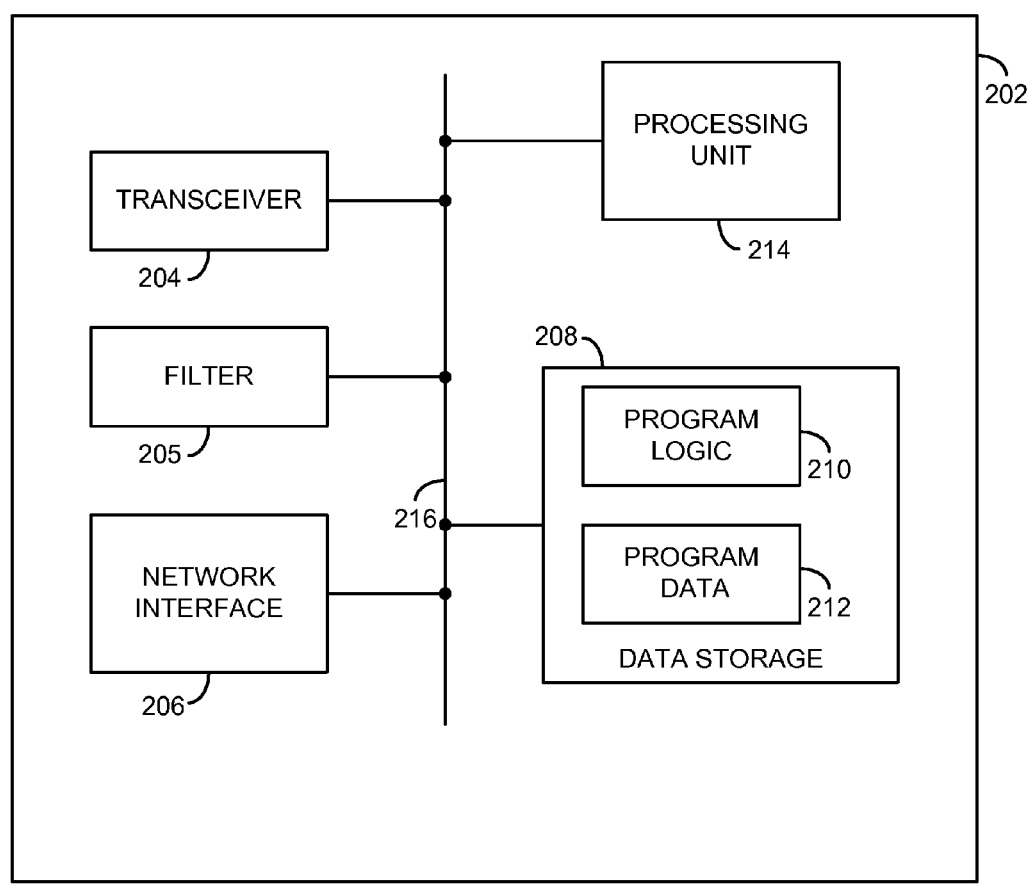
FIG. 2 is a simplified block diagram depicting functional components of an example network device.

FIG. 2 is next a simplified block diagram depicting functional components of an example network device (network entity) or system 202 that may be arranged to carry out various operations described herein. The example network device 202 may be representative of BS 26, a component of supplementary network infrastructure 28, another entity associated with the RAN or transport network, and/or a combination of components of these or other entities, whether integrated or distributed. As shown in FIG. 2, network device 202 includes a transceiver 204, a filter 205, a network interface 206, a processing unit 214, and data storage 208, all of which may be coupled together by a system bus, network, or other connection mechanism 216. Further, the network device may take other forms as well.

In practice, these components may be arranged to support conventional operation of BS 26 and/or supplementary network infrastructure 28 in a wireless-communication network, such as RAN 12 illustrated in FIG. 1, and further to support features of the presently disclosed methods.

Transceiver 204 may include one or more antennas that radiate to define at least one coverage area (e.g., coverage areas 14A and 14B) in which WCDs may operate. Transceiver 204, in combination with network interface 206, may enable the network device 202 to communicate with WCDs on a network, such as RAN 12. For example, network interface 206, in combination with transceiver 204, may enable network device 202 to transmit communications destined to WCDs, and receive communication from WCDs. Further, network interface 206 may take the form of a trunk or optical link that can be coupled any Ethernet network interface card or other physical connection that can be coupled with any other entity on the RAN 12 or transport network 32, through wired or wireless communication.

In various examples, the filter sits within a communication path through which signals flow to and/or from the WCD. In practice, the filter 205 may be either an independent component or a component integrated within another component, such as with the transceiver 204 or the network interface 206. The filter 205 may be configured to filter communication passing in the downlink direction (toward the WCD), the uplink direction (from the WCD), and/or both the downlink and uplink directions. If applied in the downlink direction, the filter may help prevent the RAN from transmitting on frequencies on which it should not transmit (such as frequencies outside of a licensed band or the like). And if applied in the uplink direction, the filter may help prevent the RAN from receiving and processing signals on frequencies on which it should not receive.

Processing unit 214 may comprise one or more general-purpose processors and/or one or more special-purpose processors (e.g., dedicated digital signal processors, application-specific integrated circuits, etc.) and may be integrated in whole or in part with the transceiver 204 and/or with other RAN components. In turn, data storage 208 may then comprise one or more volatile and/or non-volatile non-transitory storage components, such as magnetic, optical, or flash storage, and could be integrated in whole or in part with processing unit 214, as cache memory or registers for instance. As further shown, data storage 208 may hold program logic 210 and program data 212. Program logic 210 may comprise machine-language instructions that define routines executable or interpretable by processing unit 214 to carry out various operations described herein. And program data 212 may comprise reference data established and/or used during the execution of program logic 210 by processing unit 214.

As noted above, a RAN may filter the downlink communication and/or the uplink communication between the RAN and a WCD. In some examples, the RAN may have a first filter, or first set of filters, configured to filter the downlink communication and a second filter, or second set of filters, configured to filter the uplink communication. The filtering terminology and general operation in line with the present disclosure can be the same, regardless of whether filtering is of the downlink communication or the uplink communication.

Figure 3:
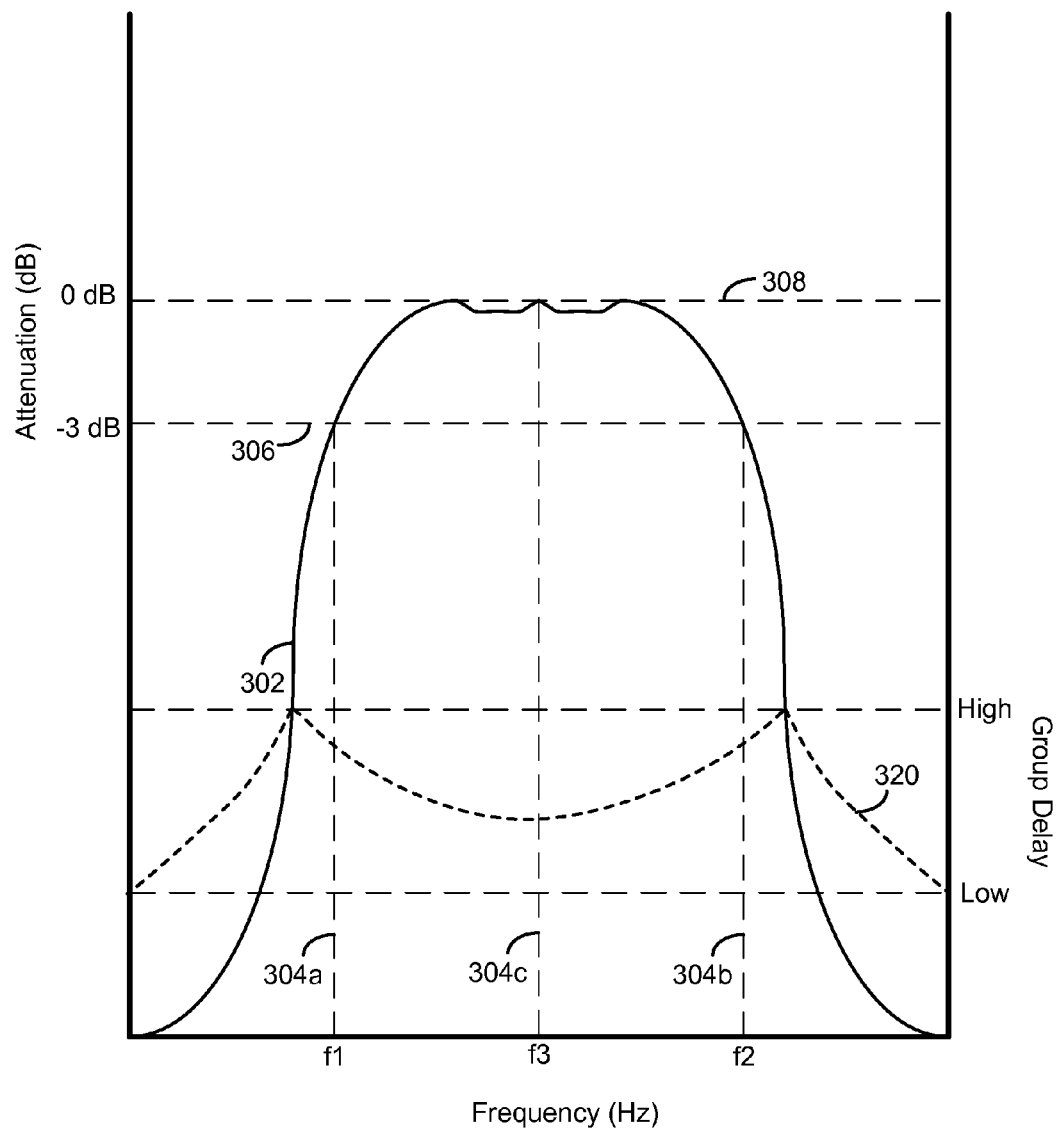
FIG. 3 is a simplified example of filter parameters for a filter usable in a communication network.

FIG. 3 is a simplified diagram of an example set of filter parameters for an example filter (such as filter 205 of FIG. 2) for use by a RAN in a communication network. The example set of filter parameters shown in FIG. 3 includes both a filter bandwidth and a group delay for the example filter. As shown in FIG. 3, the filter may be a band-pass filter. As previously discussed, a band-pass filter is a filter that is configured to pass signals having a frequency within a filter pass band and to attenuate or block signals having frequencies outside of the filter pass band.

FIG. 3 shows an example filter bandwidth having an attenuation curve 302. The attenuation curve 302 shows the filter loss (i.e., insertion loss) of the filter as a function of frequency (i.e., how much the filter will attenuate a signal applied to the filter at a given frequency). Line 308 indicates 0 decibels (dB) filter loss, meaning the signal is freely passed with no filter loss caused by the filter. The axis for the attenuation curve 302 is on the left side of FIG. 3.

An ideal filter would have 0 dB of filter loss across the frequencies within the filter bandwidth and complete attenuation across the frequencies outside the filter pass band. However, an ideal filter is likely impossible to create in the real world. Consequently, a real-world filter that can be created will not have the same ideal parameters as the ideal filter. For example, a real-world filter will have filter losses that vary with the frequency of the signal being filtered. In practice, near the center of the filter pass band a real-world filter may have lower filter losses than near the edges of the filter pass band. Additionally, some real-world filters may have high loss frequencies that are not located near the edges of the filter pass band.

The filter pass band may have a lower bound 304a. The lower bound 304a may correspond to a frequency f1. Additionally, a network operator may determine the lower bound based on a pre-determined filter loss 306. In some examples, the pre-determined filter loss 306 may be −3 dB. In alternate examples, the pre-determined filter loss that determines the filter pass band may be different than −3 dB. In any event, the lower frequency f1 where the attenuation curve 302 crosses the pre-determined filter loss 306 line is the lower bound 304a of the filter pass band.

Further, the filter pass band may have a corresponding upper bound 304b. The upper bound may correspond to a frequency f2. Similar to the lower bound 304a, a network operator may determine the upper bound based on a pre-determined filter loss 306, the upper bound may be calculated based on the pre-determined filter loss 306. Thus, the higher frequency f2 where the attenuation curve 302 crosses the pre-determined filter loss 306 line is the upper bound 304b of the filter pass band. Further, the filter pass band may also have a center 304c corresponding to frequency f3. The frequency f3 at the center 304c (i.e., (f1+f2)/2) of the filter pass band may correspond to the average of the upper bound and lower bound frequencies.

As noted above, when the filter passes signals, it may also introduce some time delay, also known as group delay, in the signals. As shown by the group delay curve 320, the amount of the group delay may vary as a function of frequency. For example, near the edges of the filter's pass band, the group delay may be higher than near the center of the filter's pass band, as indicated by the axis on the right side of FIG. 3. Further, as noted above, the GDV within a frequency channel may cause distortions in signals transmitted or received by the RAN to be higher than the signals would have been without the presence of the group delay.

Figure 4:
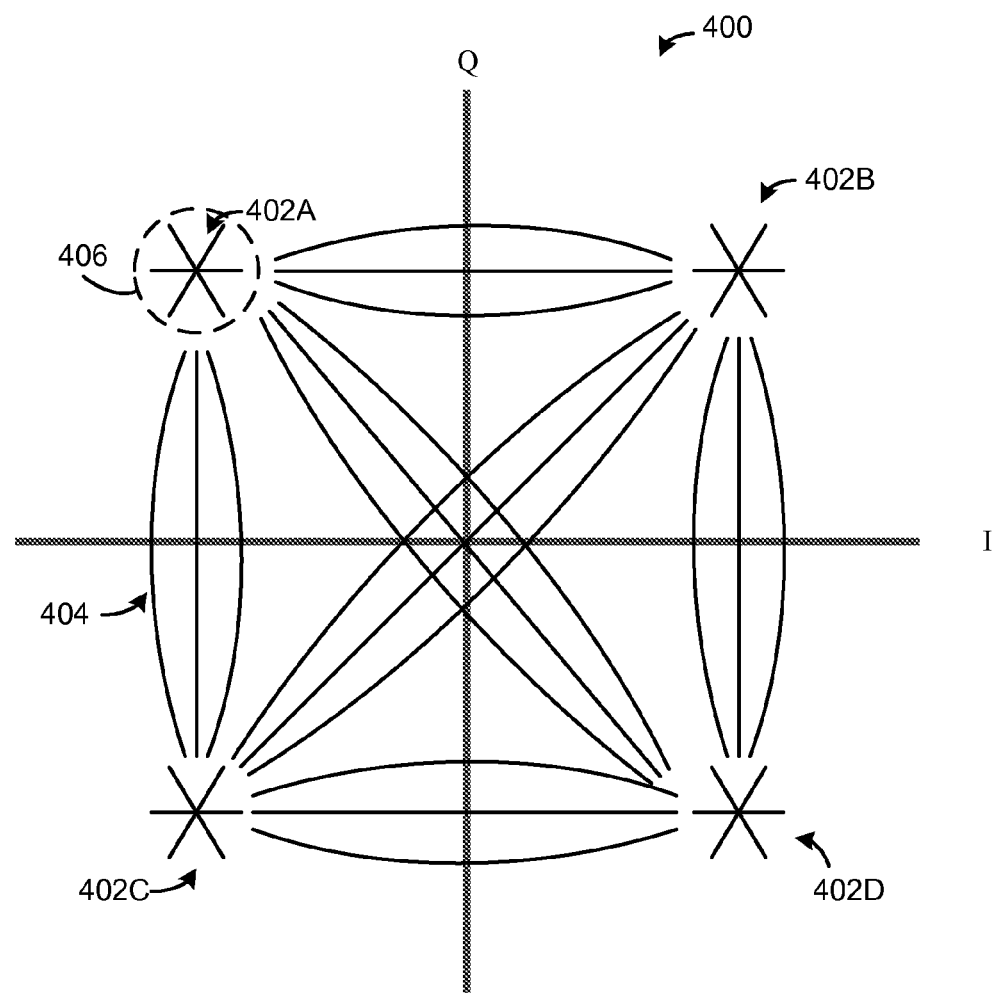
FIG. 4 is a simplified example of a constellation diagram by which a modulation quality factor may be calculated.

FIG. 4 is next a simplified example of a constellation diagram 400, which may help engineers visualize a modulation quality factor, Rho (ρ) of a frequency channel. In practice, an engineer or network component may determine the Rho value of a frequency channel by analyzing communication equipment and considering constellation diagram 400.

Rho indicates an overall modulation quality (i.e., modulation performance) level for radio communication. As noted above, the value of Rho may have a value between 0 and 1 depending on the modulation quality, with a value of 1 indicating perfect modulation (e.g., all signal), and a value of 0 indicating completely imperfect modulation (e.g., all noise).

In practice, the value of Rho may account for all possible error mechanisms that may cause distortions in the modulated signal. Some of the possible error mechanisms that may reduce Rho include baseband filtering and timing errors in the baseband, modulation defects in I/Q modulation, non-linearities in filtering, problems in coding, and distortions from power amplifier. In practice, the equipment and radio conditions in the entire transmission chain from the transmitter to the receiver may affect the value of Rho. For example, as noted above, a filter in the RAN can affect the value of Rho. To calculate Rho, the received signal power that is correlated with the hypothetical received power of an ideally modulated signal is divided by the total received power. The expression for Rho is given by Equation 1.

Equation 1: Calculation of Rho $$\rho = \frac{\text{Power}_{correlated}}{\text{Power}_{total}}$$

In one example, the Rho limit for CDMA base stations as specified in the TIA IS-97 standard is 0.912. The Rho limit indicates that 91.2% of the received power should be correlated with the hypothetical received power of an ideally modulated signal. In this example, 8.8% of the total power can be uncorrelated with the hypothetical received power of an ideally modulated signal. When Rho is below 0.912 for a frequency channel, a CDMA system may not use the channel for communication, as the modulation quality may be too poor for correct operation. For example, when Rho is below 0.912 a received signal may be too distorted from the poor modulation quality to be decoded correctly.

The uncorrelated power may appear as interference in the received signal. Therefore, because uncorrelated power may appear as interference, a low Rho value may affect the performance of a frequency channel the in the same way as a high level of radio interference and/or radio noise affects the performance of a frequency channel. Thus, as noted above, a frequency channel with a low Rho value may have a decreased capacity compared to frequency channels with a higher Rho.

A constellation diagram such as that shown in FIG. 4, also known as an I/Q diagram, represents digital signal modulation as a two dimensional scatter diagram. As shown in FIG. 4, the example constellation diagram 400 may include four possible symbol locations, shown as symbols 402A-402D. Various other digital modulation schemes may be represented by different constellation diagrams, each having different symbols 402A-402D. Based on the specific modulation scheme used in a communication network, a constellation diagram may have more or fewer possible symbols than that shown in FIG. 4. Further, different modulation schemes may have symbols in different locations than those shown in as symbols 402A-402D. However, the basic methodology for visualizing the modulation quality factor may be the same, regardless of the modulation scheme displayed.

The modulation scheme depicted in FIG. 4 is a quadrature modulation, according to which signals are transmitted based on the modulation of both a sine-based and a cosine-based carrier signal. The sine-based and cosine-based carrier signals may together be referred to as quadrature carriers, with sine-based signal being an "in-phase" or "I" signal, and the cosine-based signal being a quadrature or "Q" signal. When a receiver receives a signal with a quadrature carrier, the receiver may demodulate the sine-based and cosine-based carrier signals independently so as to determine what the signal represents.

In practice, the in-phase signal portion of a received signal may be plotted on the I-axis of constellation diagram 400, and the quadrature portion of the received signal may be plotted on the Q-axis of constellation diagram 400. In the example modulation scheme shown in FIG. 4, if transmission has no distortion or interference, each sample of data being communicated will map exactly to one of the four symbols 402A-402D. However, when the transmission has distortion or interference, samples of the data may not map perfectly to one of the symbols 402A-402D. (The additional lines or curves shown in FIG. 4 may represent transition from one symbol to another and are shown for completeness, though such transitions may not substantially impact Rho.)

In operation, a receiver may use a maximum likelihood detection process to help resolve a received signal. A maximum likelihood detector assumes that a received signal that does not align perfectly with one of the symbols 402A-402D should be whatever symbol the signal is closest to on the I/Q plane. Thus, when decoding a received signal, the receiver may attempt to determine to which symbol a signal corresponds based on the location of the signal in the I/Q plane shown in FIG. 4. As more noise and interference is present on a communication channel, signals may appear further from the correct location of the I/Q plane. Therefore, by analyzing the space over which signals appear on the I/Q plane near one of the respective symbols 402A-402D, the Rho value (i.e., a modulation quality) for a frequency channel may be visualized.

As shown in FIG. 4, for instance, a representative symbol 402A, may have a region 406 within signals intended to be represented by that symbol may exist when received. If the Rho value of a frequency channel is high, indicating high modulation quality, the region 406 may be a small area around the symbol 402A. Whereas, if the Rho value of the frequency channel is low, indicating a low modulation quality, the region 406 may be a large area around the symbol 402A. Thus, a constellation diagram 400 may provide a visual representation of the modulation quality of a communication signal based on the size of the region around the respective symbol in which signals are plotted.

Figure 5:
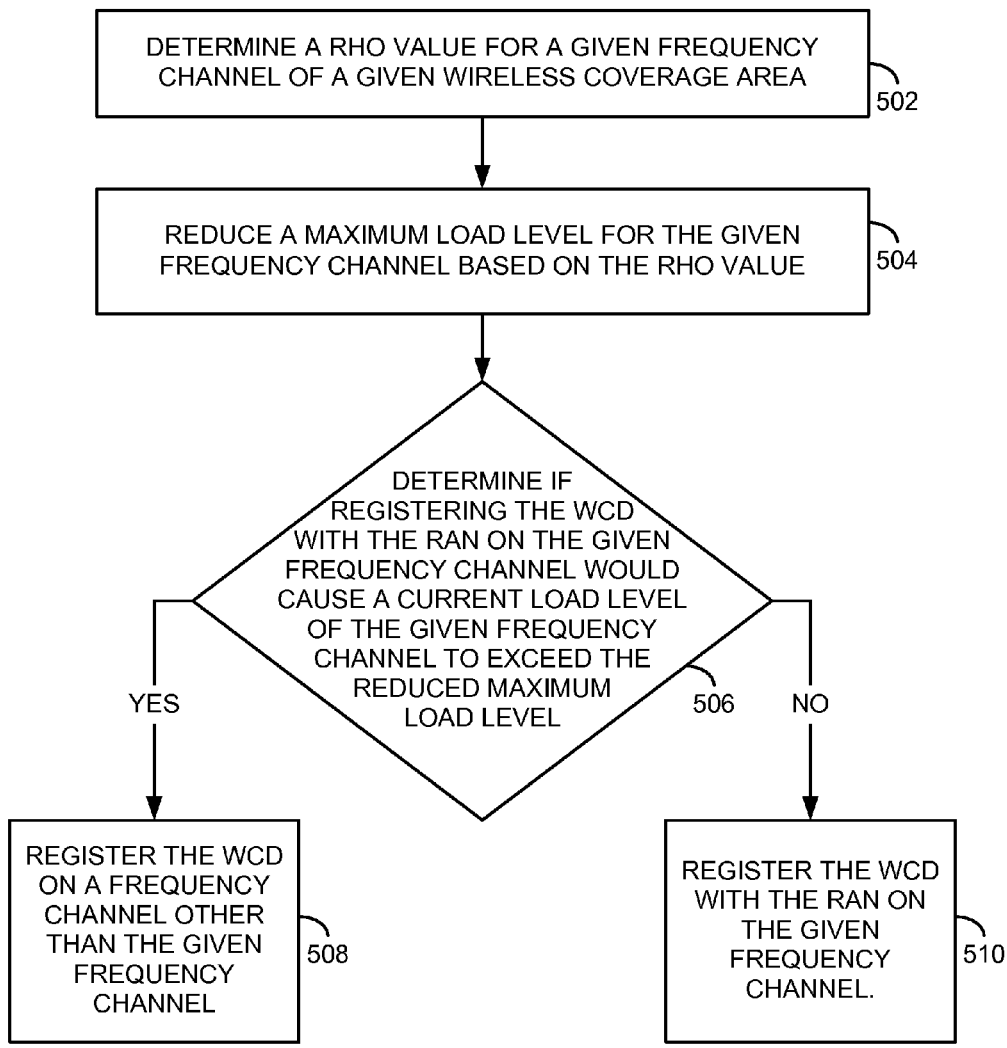
FIG. 5 is a simplified flow diagram of a method for optimizing wireless network capacity based on Rho value.

FIG. 5 is next a flow diagram of a method for optimizing wireless network capacity based on Rho value. As shown in FIG. 5, at block 502, the RAN may determine a Rho value for a given frequency channel of a given wireless coverage area. The Rho value that the RAN determines represents a modulation quality of the given frequency channel. Because a poor modulation quality may prevent the RAN from efficiently or effectively serving as many WCDs at a time on the frequency channel, the RAN may then establish a maximum load level to apply for the frequency channel. The maximum load level is a limit on the number of WCDs the RAN will allow to be served on the frequency channel and/or a limit on the throughput that the RAN will provide for data transmission on the frequency channel.

As noted above, the RAN may determine the maximum load level based on the value of Rho. In practice, for instance, the RAN may store or otherwise have access to a lookup table that correlates various values of Rho to maximum load levels, and the RAN may refer to that lookup table to determine a maximum load level for a frequency channel based on the value of Rho. For example, when a filter is installed in the RAN, the RAN may be provisioned by engineering input or the like with data that specifies the value of Rho for each frequency channel that falls within the filter's pass band. The lookup table may specify the maximum load level for each frequency channel in the RAN. The lookup tabled may be calculated in advance based on the measured GDV within a frequency channel of the various frequency channels that fall within the filter's pass band. Thus, in some examples, the RAN may determine the Rho value based on predetermined data.

In other examples, the RAN may determine the maximum load level based on an active measurement of the Rho value. For example, components of the RAN may make measurements of the filter and determine a Rho value based on the filter. Additionally, the RAN may dynamically make measurements during the operation of the radio network to determine the Rho value. In practice, radio multipath and other radio conditions may affect the Rho value as well. In one example, the RAN may evaluate received signal quality on a frequency channel and determine a value of Rho based on the received signal quality. As part of this example, the RAN may compare a received pilot signal with a desired pilot signal to determine the Rho value. The RAN may determine a Rho value for each frequency channel within a given a given coverage area served by the RAN.

At block 504, the RAN may reduce a maximum load level for the given frequency channel based on the Rho value. In practice, for instance, the RAN may default to having the maximum load level equal to the theoretical maximum load level, or some other predetermined maximum load level, and the RAN may reduce the maximum load level from the theoretical maximum load level based on the determined maximum load level.

As previously discussed, the RAN determines the maximum load level for a frequency channel based on the determined value of Rho. The determined maximum load level may be either (i) a maximum number of WCDs that may communication via the frequency channel or (ii) a maximum throughput for the frequency channel.

Further and as previously discussed, a low Rho value indicates the given frequency channel has a low modulation quality, and the low modulation quality may manifest as distortions in signals. WCDs served by the RAN may perceive these distortions as reduced signal-to-noise ratio on the given frequency channel. Therefore, it may be desirable to operate the RAN in a way to reduce any further signal-to-noise degradation on the frequency channel. Because each additional WCD operating on a wireless channel contributes to the noise received by other WCDs operating on the same channel, reducing the maximum load level on a channel may help prevent the signal-to-noise ratio from becoming too low for correct operation of the WCD.

At block 506, the RAN may determine if registering the WCD with a RAN on the given frequency channel would cause a current load level of the given frequency channel to exceed the reduced maximum load level. When a WCD attempts to register with the RAN on a frequency channel, the RAN may determine a present load level on the frequency channel. The RAN may further determine the current load level on the frequency channel if the WCD was allowed to register on the frequency channel. In examples where the load limit is a maximum number of WCDs, the RAN may compare the maximum number of WCDs allowed to register on the frequency channel with the number of WCD that would be registered if the WCD that is attempting to register was allowed to register. Additionally, in examples where the load limit is a maximum throughput for the frequency channel, the RAN may compare the maximum throughput allowed on the frequency channel with the approximate throughput if the WCD that is attempting to register was allowed to register.

At block 508, if registering the WCD with the RAN on the given frequency channel would cause a current load level of the given frequency channel to exceed the reduced maximum load level of the given frequency channel, the RAN may register the WCD on a frequency channel other than the given frequency channel. In some examples, the frequency channel other than the given frequency channel may be a different frequency channel within the same coverage area. In other examples, the frequency channel other than the given frequency channel may be a frequency channel within a different coverage area. For example, a single RAN may serve multiple coverage areas. The RAN may instruct a WCD to register on a different coverage area served by the RAN if the WCD registering on a given frequency channel would cause that frequency channel to exceed its maximum load level.

At block 510, if registering the WCD with the RAN on the given frequency channel would not cause a current load level of the given frequency channel to exceed the reduced maximum load level of the given frequency channel, the RAN may allow the WCD to register with the RAN on the given frequency channel. The WCD may register with the RAN as normal when the registration of the WCD on a frequency channel would not cause the RAN to exceed its maximum load level.

V. CONCLUSION

Example embodiments have been described above. Those skilled in the art will understand, however, that changes and modifications may be made to these embodiments without departing from the true scope of the invention, which is defined by the claims.

What is claimed is:

1. A method performed by a radio access network (RAN), wherein the RAN is configured to provide a given wireless coverage area having a plurality of frequency channels, wherein each frequency channel of the plurality of frequency channels has a maximum load level, and wherein each frequency channel of the given wireless coverage area has a Rho value representative of a modulation quality for the frequency channel, the method comprising:

determining a reduced maximum load level for a given frequency channel based on the Rho value of the given frequency channel, wherein the Rho value of the given frequency channel is based on provisioned data stored in a memory of the RAN prior to the RAN providing the given wireless coverage, and wherein the Rho value is based on where the given frequency channel falls within a pass band of a filter located in a communication pathway between the RAN and a wireless communication device (WCD);

in response to the WCD communicating a registration request to the RAN on the given frequency channel, making a determination of whether registering the WCD with the RAN on the given frequency channel would cause a current load level of the given frequency channel to exceed the reduced maximum load level of the given frequency channel;

if the determination is that registering the WCD with the RAN on the given frequency channel would cause a current load level of the given frequency channel to exceed the reduced maximum load level of the given frequency channel, registering the WCD on a frequency channel other than the given frequency channel; and if the determination is that registering the WCD with the RAN on the given frequency channel would not cause a current load level of the given frequency channel to exceed the reduced maximum load level of the given frequency channel, registering the WCD with the RAN on the given frequency channel.

2. The method of claim 1, wherein the Rho value is based on a group delay of a band-pass filter of the RAN.

3. The method of claim 1, wherein the RAN is further configured to provide more than one wireless coverage area, each wireless coverage area having a plurality of frequency channels, wherein the frequency channel other than the given frequency channel is a frequency channel in a wireless coverage area other than the given wireless coverage area.

4. The method of claim 1, wherein the reduced maximum load level is a maximum number of WCDs that can communicate over the given frequency channel.

5. The method of claim 1, wherein registering the WCD on a frequency channel other than the given frequency channel further comprises the RAN registering the WCD on a frequency channel of the given wireless coverage area other than the given frequency channel.

6. The method of claim 1, wherein the reduced maximum load level is determined based on a lookup table stored in a memory of the RAN.

7. A radio access network (RAN) comprising:

a transceiver configured to provide a given wireless coverage area having a plurality of frequency channels, and wherein each frequency channel of the plurality of frequency channels has a maximum load level, and wherein each frequency channel of the given wireless coverage area has a Rho value representative of a modulation quality for the given frequency channel; and a processor configured to:
  determining a reduced maximum load level for a given frequency channel based on the Rho value of the given frequency, wherein the Rho value of the given frequency channel is based on provisioned data stored in a memory of the RAN prior to the RAN providing the given wireless coverage, and wherein the Rho value is based on where the given frequency channel falls within a pass band of a filter located in a communication pathway between the RAN and a wireless communication device (WCD);
  in response to the WCD communicating a registration request to the RAN on the given frequency channel, make a determination of whether registering the WCD with the RAN on the given frequency channel would cause a current load level of the given frequency channel to exceed the reduced maximum load level of the given frequency channel;
  if the determination is that registering the WCD with the RAN on the given frequency channel would cause a current load level of the given frequency channel to exceed the reduced maximum load level of the given frequency channel, register the WCD on a frequency channel other than the given frequency channel; and
  if the determination is that registering the WCD with the RAN on the given frequency channel would not cause a current load level of the given frequency channel to exceed the reduced maximum load level of the given frequency channel, register the WCD with the RAN on the given frequency channel.

8. The RAN of claim 7, further comprising a band-pass filter, wherein the Rho value is based on a group delay of the band-pass filter.

9. The RAN of claim 7, wherein the transceiver is further configured to provide more than one wireless coverage area, each wireless coverage area having a plurality of frequency channels, wherein the frequency channel other than the given frequency channel is a frequency channel in a wireless coverage area other than the given wireless coverage area.

10. The RAN of claim 7, wherein the reduced maximum load level is a maximum number of WCDs that can communicate over the given frequency channel.

11. The RAN of claim 7, wherein registering the WCD on a frequency channel other than the given frequency channel further comprises the RAN registering the WCD on a frequency channel of the given wireless coverage area other than the given frequency channel.

12. The RAN of claim 7, wherein the reduced maximum load level is determined based on a lookup table stored in a memory of the RAN.

13. An article of manufacture including a non-transitory computer-readable medium having stored thereon program instructions that, when executed by a processor in a radio access network (RAN), cause the RAN to perform operations comprising:
  providing a given wireless coverage area having a plurality of frequency channels, and wherein each frequency channel of the plurality of frequency channels has a maximum load level, and wherein each frequency channel of the given wireless coverage area has a Rho value representative of a modulation quality for the given frequency channel;
  determining a reduced maximum load level for a given frequency channel based on the Rho value of the given frequency channel, wherein the Rho value of the given frequency channel is based on provisioned data stored in a memory of the RAN prior to the RAN providing the given wireless coverage, and wherein the Rho value is based on where the given frequency channel falls within a pass band of a filter located in a communication pathway between the RAN and a wireless communication device (WCD);
  in response to the WCD communicating a registration request to the RAN on the given frequency channel, making a determination of whether registering the WCD with the RAN on the given frequency channel would cause a current load level of the given frequency channel to exceed the reduced maximum load level of the given frequency channel;
  if the determination is that registering the WCD with the RAN on the given frequency channel would cause a current load level of the given frequency channel to exceed the reduced maximum load level of the given frequency channel, registering the WCD on a frequency channel other than the given frequency channel; and
  if the determination is that registering the WCD with the RAN on the given frequency channel would not cause a current load level of the given frequency channel to exceed the reduced maximum load level of the given frequency channel, registering the WCD with the RAN on the given frequency channel.

14. The article of manufacture of claim 13, wherein the Rho value is based on a group delay of a band-pass filter of the RAN.

15. The article of manufacture of claim 13, wherein the reduced maximum load level is a maximum number of WCDs that can communicate over the given frequency channel.

16. The article of manufacture of claim 13, wherein registering the WCD on a frequency channel other than the given frequency channel further comprises the RAN registering the WCD to on a frequency channel of the given wireless coverage area other than the given frequency channel.

17. The article of manufacture of claim 13, wherein the reduced maximum load level is determined based on a lookup table stored in a memory of the RAN.

* * * * *